(12) United States Patent
Franklin (10) Patent No.: US 8,578,885 B2
(45) Date of Patent: Nov. 12, 2013

(54) ANIMAL WASTE DISPOSAL APPARATUS

(76) Inventor: Eoin Franklin, Limerick (IE)

( * ) Notice: Subject to any disclaimer, the term of this patent is extended or adjusted under 35 U.S.C. 154(b) by 157 days.

(21) Appl. No.: 12/803,318

(22) Filed: Jun. 25, 2010

(65) Prior Publication Data

US 2011/0315083 A1   Dec. 29, 2011

(51) Int. Cl.
  *A01K 29/00*   (2006.01)
(52) U.S. Cl.
  USPC ............................................. 119/161; 232/44
(58) Field of Classification Search
  USPC ........... 119/161, 162, 165, 168; 232/39, 43.1, 232/44, 51, 52, 28, 47; 4/312, 441, 442, 4/273
  See application file for complete search history.

(56) References Cited

U.S. PATENT DOCUMENTS

| | | | | |
|---|---|---|---|---|
| 450,379 A | * | 4/1891 | Sinclaire | 232/51 |
| 613,795 A | * | 11/1898 | Costello | 232/47 |
| 652,916 A | * | 7/1900 | Kline | 232/51 |
| 2,480,685 A | * | 8/1949 | Adams | 232/44 |
| 3,018,945 A | * | 1/1962 | Day | 232/44 |
| 3,021,051 A | * | 2/1962 | Day | 232/44 |
| 3,603,290 A | * | 9/1971 | O'Rork | 119/162 |
| 3,829,906 A | * | 8/1974 | McPhee | 4/312 |
| 3,919,726 A | * | 11/1975 | Godwin et al. | 4/312 |
| 4,029,262 A | | 6/1977 | Lazich et al. | |
| 4,050,414 A | | 9/1977 | Knochel et al. | |
| 4,063,520 A | * | 12/1977 | Parsons | 109/66 |
| 4,271,544 A | | 6/1981 | Hammond | |
| 4,466,357 A | * | 8/1984 | Masachika | 109/66 |
| 4,502,413 A | | 3/1985 | Ponce et al. | |
| 4,768,670 A | * | 9/1988 | Lin | 294/68.24 |
| 4,944,047 A | * | 7/1990 | Gagliano | 4/312 |
| 4,975,989 A | * | 12/1990 | Sutton | 4/300 |
| 5,027,451 A | * | 7/1991 | Wooten et al. | 4/661 |
| 5,090,546 A | * | 2/1992 | McDermott | 193/34 |
| 5,392,946 A | | 2/1995 | Holbrook | |
| 6,439,161 B1 | * | 8/2002 | Clemmons | 119/165 |
| 6,453,844 B1 | | 9/2002 | Janzen et al. | |
| 6,590,146 B1 | | 7/2003 | Mrsny | |
| 6,615,414 B2 | * | 9/2003 | Miller et al. | 4/321 |
| 6,647,923 B2 | * | 11/2003 | Nicoud et al. | 119/161 |
| 6,792,628 B1 | | 9/2004 | Humphrey | |
| 6,986,171 B1 | * | 1/2006 | Perrin | 4/312 |
| 7,426,891 B2 | | 9/2008 | Loving | |
| 7,506,615 B1 | | 3/2009 | Sansone et al. | |
| 2001/0013497 A1 | | 8/2001 | Kolber | |
| 2004/0226895 A1 | | 11/2004 | Bromley | |
| 2005/0098072 A1 | | 5/2005 | Mooney | |
| 2005/0284388 A1 | | 12/2005 | Kunz | |

(Continued)

FOREIGN PATENT DOCUMENTS

DE   20308680    8/2003
EP    1457438    9/2004

(Continued)

*Primary Examiner* — Rob Swiatek
*Assistant Examiner* — Kathleen Iwasaki
(74) *Attorney, Agent, or Firm* — Ziegler IP Law Group, LLC.

(57) ABSTRACT

This invention relates to a method and apparatus for the disposal of animal waste, and is particularly concerned with providing a solution that is economical, hygienic, and environmentally sound. This invention may be used domestically in two main varying ways: in a configuration whereby the invention connects into any access point of a domestic sanitary sewer system, or via an in-line configuration whereby the invention is incorporated into any standard waste downpipe. This invention may be used commercially in a public setting whereby the invention is incorporated into a 'vending' machine, allowing limited access for use by varying limited access means and methods.

14 Claims, 6 Drawing Sheets

(56) References Cited

U.S. PATENT DOCUMENTS

| | | |
|---|---|---|
| 2006/0144303 A1 | 7/2006 | Loving |
| 2006/0261143 A1* | 11/2006 | Sola Barbarin et al. ..... 232/43.1 |
| 2007/0094782 A1* | 5/2007 | Park .............................. 4/420.4 |
| 2008/0178817 A1 | 7/2008 | Brewer |
| 2010/0006636 A1* | 1/2010 | Frankenberg et al. .......... 232/44 |

FOREIGN PATENT DOCUMENTS

| | | |
|---|---|---|
| FR | 2675477 | 10/1992 |
| FR | 2806711 | 9/2001 |
| FR | 2906107 | 3/2008 |
| GB | 2208880 | 4/1989 |
| GB | 2304351 | 3/1997 |
| GB | 2329323 | 2/1998 |
| GB | 2399343 | 9/2004 |
| GB | 2481413 | 12/2011 |
| JP | 2078815 | 3/1990 |
| JP | 11169004 | 6/1999 |
| JP | 2003325073 | 11/2003 |
| KR | 20020030764 | 4/2002 |

* cited by examiner

ANIMAL WASTE DISPOSAL APPARATUS

BACKGROUND

The aspects of the disclosed embodiments relate to a method and device for the disposal of animal waste, and in particular to providing a method and device that is economical, hygienic, and environmentally sound.

In the US, it is estimated that almost 2 in five households have a dog. This essentially means that there are 62 million dogs in the US alone. It is common now for canine laws around the world to impose significant fines for improper disposal, or lack of disposal of dog waste. Clearly then, animal waste and the problems caused by improper disposal are of great importance to a household, town, or city on a private or public basis.

Various methods have been advocated for the gathering of animal waste within a domestic or public environment, most commonly the 'scooper', 'grabber', or 'bagging' type devices (see list 1 for Patent References). Once the waste has been gathered, it must be disposed of in a clean an efficient manner, commonly it is thrown in a designated animal waste bin, domestic refuse bin, buried, placed in a biodegradable or decomposition system, burnt, or flushed into a domestic waste system via a household toilet, or via an external animal waste removal and/or flushing type device.

There are numerous problems with these methods:

The problem with placing the animal waste that has been collected within a domestic setting, using a 'scooper', or 'grabber' type device, then placed directly into a domestic refuse bin is that the odour of the animal waste will permeate throughout the domestic refuse bin causing an unpleasant odour in the region surrounding the domestic refuse bin.

If the animal waste has been gathered and contained using a 'bagging' type device when the animal has been out on a walk or simply gathered from within a domestic environment, if the bag is not made from a biodegradable material, it can increase the environmental cost and also the general financial cost of having to put the bin out for collection on a more frequent basis due to the increased build-up of animal waste and to the unpleasant permeating odours.

Furthermore, there are problems associated with flushing the disposable bags down domestic toilets as animal owners may not want to risk blocking their internal household plumbing network. As a result, the next option is to bury the waste or place the animal waste in private biodegradable or decomposition systems.

The problem with burying the animal waste or placing the animal waste in a biodegradable, or decomposition system is that these solutions require an outdoor space which is not used for other purposes. Furthermore, these solutions are time consuming and more unpleasant, in particular, burying the animal waste on every occasion is very time consuming and laboursome. There may also be unpleasant odours associated with the use of biodegradable and decomposition systems as it takes time for the animal waste to break down. There is also a significant cost related to the installation, use, and up-keep of these private biodegradable and decomposition systems.

A further solution that has been employed in the past is to install a branched 'Y' shaped fitting to an existing external waste downpipe. The main problem with this is that almost all waste down pipes in American homes are internal, which suggests that this system only provides a solution for domestics homes in countries such as the UK where external waste downpipes are commonplace. On the off-chance that an external waste downpipe does exist, a further problem with this system is that the fitting requires a four inch screw cap which is cumbersome to use as the opening is simply too small to allow most 'scoopers' or 'grabber' type devices to cleanly release the animal waste directly into the opening. The only suitable way to use this system therefore, is for the owner to gather the animal waste using a biodegradable bag, and then place their hand directly into the waste pipe, which is connected directly to a sewer waste removal downpipe. To do this is quite unhygienic. This solution also requires that you to manually flush the pipe after use in order to ensure the animal waste has indeed progressed in to the main flow waste pipe, and not simply resting within the 'Y' connection pipe.

Animal waste may also be burnt or incinerated, but as these methods require an apparatus to incinerate the animal waste, the financial cost of these devices is high. Furthermore, after incineration, the ashes must still be disposed of in an appropriate manner, making the whole process costly and laboursome.

There is a further solution which essentially provides a toilet facility for the animal. That is, the animal excretes waste which is then, in varying ways, directed into a general household waste sewer system by varying methods including flushing, levering, and conveyer belt. The problem with these methods is that directing the animal waste is awkward at best, and for the most part would realistically rely on the use of more basic apparatus; commonly the 'scooper', 'grabber', or 'bagging' type devices to complete the procedure. Further problems would include that the animal has to be trained to excrete its' waste in a fairly precise designated spot which will take quite a lot of time, and for most dog owners is unrealistic and far too time consuming. All of these products are cumbersome and complicated in design which increases their financial cost.

Finally, on a commercial or municipal level, the only current solution is to provide bins for the depositing of animal waste. These bins for the most part only recommend that the animal waste be deposited within a suitable biodegradable bag. Therein lies the first problem, because the bin is not continually controlled, any type of rubbish may be deposited. Further, there is a relatively high cost for commercial entities and local authorities to provide bins specifically for animal waste disposal, and to dispose of the waste in an environmentally acceptable way. These bins must be regularly emptied in order to obviate any hygiene concerns and/or unpleasant odours that may otherwise emanate from the bins if they are left unemptied for a long period of time.

Furthermore, each of the bins must be maintained by regular cleaning which is costly and time consuming. As a consequence, the financial burden of installing and maintaining public animal waste disposal bins has been found to be costly and time consuming.

As a consequence, the number of animal waste bins provided by local authorities is relatively low, and commercially is non-existent. Quite often if an animal owner has collected the waste it is likely that there is no animal waste bin nearby. Thus, the animal owner is forced to carry around the animal waste in a disposable bag on their person until they have an opportunity to dispose of the bag in a private domestic bin or by other means. This is unsatisfactory as it is unpleasant for the animal owner to be carrying around the animal waste on their person for any period of time.

Clearly then, it is quite obvious that there is a need for a simple, clean, cost effective, and environmentally sound system to enable the depositing of animal waste in private domestic environments, public and commercial environments alike. It is the goal of this invention to provide an apparatus and method that overcomes at least one of the afore mentioned problems.

BRIEF SUMMARY

This invention relates to an animal waste disposal unit comprising a housing having an interior compartment to receive animal waste and an opening through which animal waste may be passed into the interior compartment which in turn directs the waste into a sanitary sewer.

This invention may be used domestically or commercially. This invention may be used domestically in two main ways (however, because the upper and lower connecting points of the invention comply with standard plumbing codes, connecting the invention to any sewer access point in a number of varying ways is possible): via an in-line configuration whereby the invention is incorporated into a waste downpipe connected through its' upper and lower openings, or in a configuration whereby the invention installs into any waste pipe access point via it's lower opening, the upper opening in this case would be capped.

The advantage of both types of domestic systems mentioned above over current solutions are as follows;
a) They provide instant waste removal for any current method used to collect animal waste from the ground.
b) At no point will the user be exposed to the internal workings of the waste disposal network.
c) In a particular embodiment, the unit has a locking mechanism which prevents any unauthorised use.
d) The unit is environmentally cost effective.
e) The unit is financially cost effective.
f) The unit will not allow any permeating odours.
g) The unit can be incorporated into any existing domestic waste disposal network with the minimum of effort.
h) Once the invention has been opened to receive the animal waste, the user will be "hands free", making the use of the device simple and functional.

This invention may be used commercially in a public setting whereby different embodiments of the invention would provide limited access for use by either a monetary based function, by a code system (eg: bar code), or by an alphanumerical code system (but not limited to these controlled access systems alone), whereby, a pre-bought biodegradable animal waste bag would contain a unique code, or alphanumerical code, in turn this code would be scanned or manually entered into the corresponding embodiment providing limited access to the waste removal device. Further embodiments of these versions would also incorporate some form of automatic flushing and cleaning system. Another further embodiment would incorporate a vending unit to facilitate the distribution of animal related products.

The advantage of the commercial/public embodiments mentioned above over current solutions are as follows;
a) Once they have been bought and installed, there is no further cost to the owner, in fact, through the varying 'payment for use' embodiments, the system will provide an income, potentially covering its' own installation cost and general upkeep, and even begin to potentially make profit.
b) It eliminates the need and cost for specialised animal waste removal service companies.
c) It eliminates the need and cost for specialised animal waste disposal companies.
d) It automatically cleans itself after each use which eliminates the cost of specialised animal waste bin cleaning companies.
e) There will be no permeating odours as once the animal waste is deposited, it is automatically flushed away into the sanitary sewer network.
f) The user will never be faced with an over-flowing bin, permeating odours, or general 'overuse' issues associated with current 'bin' solutions.

The present invention is directed to an animal waste disposal unit comprising a housing having a top wall, a bottom wall, and one or more side walls to form an interior compartment to receive animal waste, the housing comprising an opening on one of the side walls through which the animal waste may be passed into the interior compartment of the housing, wherein, the waste disposal unit further comprises a tray mounted in the opening of the housing and moveable between an open, waste receiving position and a closed position; the tray forming a seal against the opening of the housing when in either the open, waste receiving position or the closed position.

The advantage of providing a moveable tray mounted in the opening of the housing is that a user, such as an animal owner, will find it relatively easy to access the interior compartment of the housing by simply moving the tray into the open, waste receiving position to receive the animal waste and subsequently move the tray back into the closed position to dispose of the animal waste into the interior compartment.

In a further embodiment, the tray comprises at least a first and second panel angled relative to one another to form an animal waste receptacle when the tray is in the open, waste receiving position, whereby, the first panel extends outwardly from the housing presenting the animal waste receptacle to a user and a second panel seals the opening of the housing; and, when the tray is in the closed position, the first panel seals the opening of the housing.

In a further embodiment, a second panel is sufficiently angled relative to the first panel so as to protrude downwardly towards the interior compartment of the housing when the tray is in the closed position so as to cause any animal waste placed in the animal waste receptacle by the user to advance out of the tray into the interior compartment of the housing.

A further advantage of providing a tray that comprises panels which seal the opening of the housing when the tray is in a closed position or open position respectively is that the interior compartment of the housing of the animal waste unit is almost continually sealed from the environment surrounding the animal waste disposal unit. This seal will only be broken for a very brief moment of time as the tray transitions from its open position to its closed position, or from its closed position to its open position. Thus, the odour emanating from the interior compartment of the animal waste disposal unit is prevented from fouling the region adjacent to the animal waste disposal unit.

In a further embodiment, the tray comprises a handle to allow the user to move the tray from the closed position into the open, waste receiving position, and visa versa.

In a further embodiment, the tray is biased to move into the closed position from the open, waste receiving position.

In a further embodiment, the tray comprises a latch to retain the tray in the open, waste receiving position.

In a further embodiment, the animal waste disposal unit comprises a child lock mechanism to prevent a child moving the tray into the open, waste receiving position. This will prevent young children from accessing the animal waste disposal unit and potentially causing any hygiene issues.

In a further embodiment, the animal waste disposal unit comprises a lock mechanism to prevent any unauthorised use.

In a further embodiment, the animal waste receptacle comprises a low friction panel to encourage animal waste in the animal waste receptacle to advance out of the tray into the interior compartment when the tray is in the closed position.

In a further embodiment, the housing comprises upper and lower openings in the top wall and bottom wall respectively to allow the animal waste disposal unit to be retrofit, in-line, to an existing waste disposal pipe. As the diameter of the downpipes and subsequent pipes in the waste disposal network are relatively wide in comparison to the internal pipes found in the plumbing system of a home, it is far less likely that blockages will occur in these down-pipes.

In a further embodiment, the upper and lower openings comprise flanged ends to permit a fluid-tight connection to be made between the animal waste disposal unit and the waste disposal pipe.

In a further embodiment, the housing unit is simply glued or clamped, or both, in place around the household waste downpipe. This insures simple installation, as instead of having to sever the household waste downpipe in order to fit the animal waste disposal unit, a small aperture need only be cut from the pipe, and the animal waste disposal unit clamped and/or glued in place around the aperture. As a result, the animal waste disposal unit will not need to be further restrained against the wall In a further embodiment, the first panel of the tray is larger than the second panel of the tray so as to form an effective shield for the user, preventing the user from being splashed by fluids passing through the waste disposal pipe, as the tray is moved from the open position to the closed position.

In a further embodiment, the tray comprises a tapered channel from the animal waste receptacle to funnel animal waste from the animal waste receptacle into the waste disposal pipe.

In a further embodiment, the tray comprises a further overflow tapered channel from the animal waste receptacle to funnel overflowing water and/or waste from the animal waste receptacle into the waste disposal pipe.

In a further embodiment, the animal waste disposal unit comprises a lower opening in the bottom wall to allow the animal waste disposal unit to be retrofit and connected to an existing manhole or sewer pipe access point, thus facilitating fluid communication between the interior compartment of the housing and an existing waste disposal network.

This embodiment is also seen as being particularly advantageous because the animal waste disposal unit may be connected to a manhole cover or sewer pipe access point, so as to provide immediate and direct access to a waste disposal network. This is particularly advantageous as very little installation is required and access to a waste downpipe is not required.

In a further embodiment, the lower opening comprises a depending collar to permit a fluid-tight connection to be made between the interior compartment of the housing and the waste disposal network.

In a further embodiment, the lower opening comprises a depending collar to permit a fluid-tight connection to be made between the interior compartment of the housing and the waste disposal network via any suitable plumbing products for joining pipework depending on the plumbing codes of the municipality of where it is installed.

In a further embodiment, the animal waste disposal unit comprises an animal waste disposal conduit having a distal end which is connectable to a remote existing waste disposal network. Therefore, direct access to a waste disposal network is not required.

In a further embodiment, the animal waste disposal unit comprises a flushing mechanism. The use of a flushing mechanism is seen as a particularly advantageous embodiment as the liquid used to flush the animal waste will ensure that the animal waste is advanced along the conduit to the remote waste disposal network.

In a further embodiment, the flushing mechanism comprises a water conduit having a distal end which is connectable to an existing water supply.

In a further embodiment, the flushing mechanism comprises a water conduit having a distal end which is connectable to an existing water supply, and this flushing system is automatic.

In a further embodiment, the animal waste disposal unit comprises a payment unit to facilitate monetary based unlocking and operation of the animal disposal unit.

In a further embodiment, the animal waste disposal unit comprises a code scanning unit to facilitate unlocking and operation of the animal waste disposal unit based on specific coded biodegradable animal waste bags.

In a further embodiment, the animal waste disposal unit comprises an alphanumerical keypad unit to facilitate unlocking and operation of the animal waste disposal unit by inputting the alphanumerical code from coded biodegradable animal waste bags.

In a further embodiment, the animal waste disposal unit comprises a lock to prevent non-monetary, coded, or alphanumerical coded based operation of the animal disposal unit.

In a further embodiment, the animal waste disposal unit comprises a vending unit to facilitate the distribution of biodegradable bags for receiving and holding animal waste.

In a further embodiment, the animal waste disposal unit comprises a vending unit to facilitate the distribution of animal related products.

BRIEF DESCRIPTIONS OF THE DRAWINGS INCLUDED

FIGS. 2a, 2b, 2c, and 2d are the exploded side views of an animal waste disposal unit in accordance with the present invention:

DETAILED DESCRIPTION OF THE DISCLOSED EMBODIMENTS

Figure 1A:
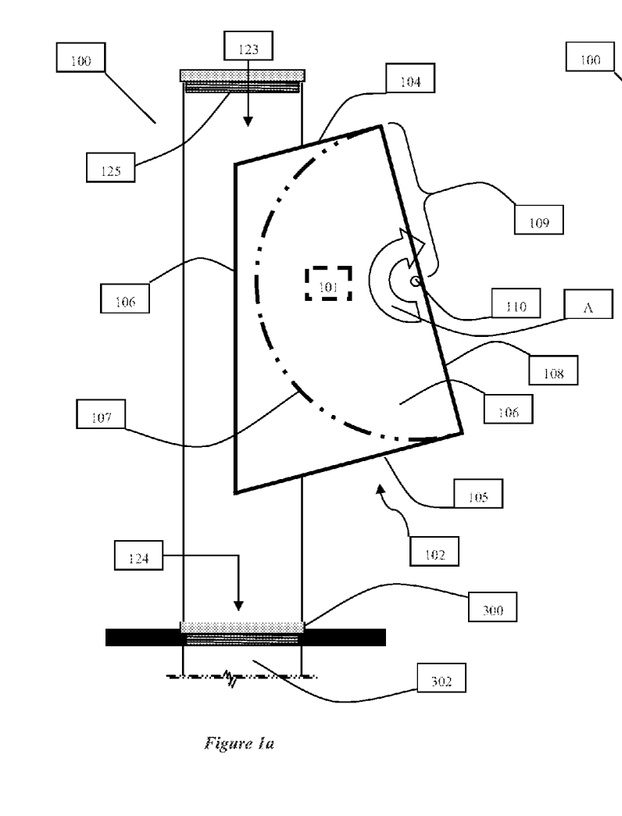
FIG. 1a is a side view of an animal waste disposal unit in accordance with the present invention, shown in its' closed position, with the internal curved wall of the main housing shown as a dashed line.
Figure 1B:
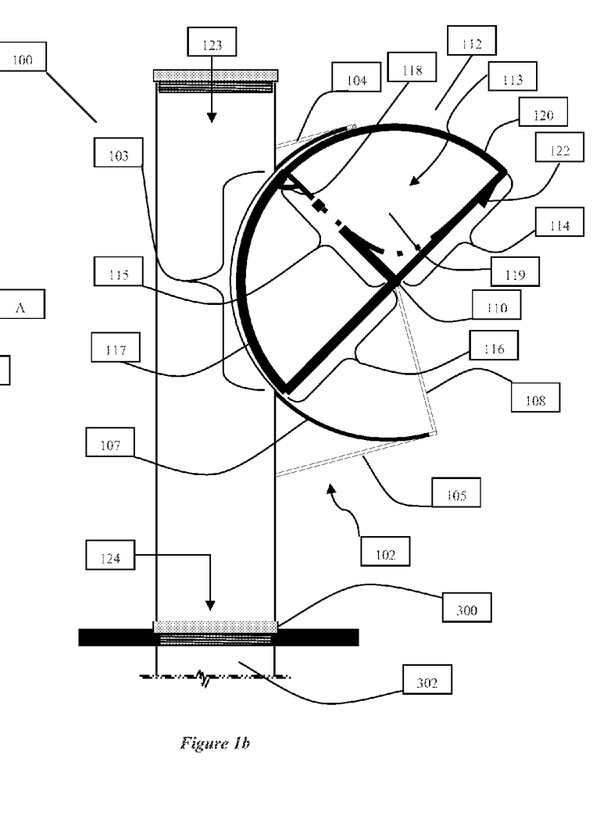
FIG. 1b is a side view of an animal waste disposal unit in accordance with the present invention, shown in its' open waste receiving position, with the side wall of the main housing removed, and with the side wall of the moveable tray removed.

Referring to the drawings and initially to FIGS. 1a and 1b, there is provided an animal waste disposal unit indicated generally by the reference numeral 100. The animal waste disposal unit 100 comprises a housing indicated generally by reference numeral 102 having a top wall 104, a bottom wall 105, side walls 106, an interior curved shaped wall 107, and a partial front wall 108. The top wall 104, bottom wall 105, side walls 106, interior curved shaped wall 107, and partial front wall 108, form an interior compartment 101 within the housing 102. An opening 109 is provided above the free end of the diagonally inward sloping front wall 108 of the housing 102. The animal waste disposal unit 100 further comprises a tray indicated generally by reference numeral 112, which is mounted 110 to the free end of the diagonally inward sloping front wall 108. The interior curved shaped wall 107 provides a barrier for which the tray 112 may rotate against to direct the waste in through the aperture 103, thus ensuring any waste is disposed of directly into a waste disposal conduit 302. The aperture 103 is cut from the interior curved shaped wall 107 that is contained within the housing 102. The animal waste conduit 302 is connected to a waste disposal network (not shown).

The tray 112 may be moved about a point 110 at the free end of the diagonally inward sloping front wall 108, as indicated by reference arrow A, from an upright, closed position to an open, waste receiving position. The upper waste receiving section of the tray 112 comprises a first panel 114 and a second panel 115 which are angled relative to one another to form a V-shaped, animal waste receptacle 113 when the tray 112 is moved into its open position. The upper waste receiving section of the tray 112 further comprises side panels 119, and tapered curved panels 120, which combine about the animal waste receptacle 113. A handle 122 is provided on the first panel 114 to assist a user (not shown) to move the tray 112 between its closed position into its open position. The tray further comprises a curved subsection. The subsection comprises a second panel 115, a third panel 116, side panels 119, and a curved panel 117, which rotate against the interior curved shaped wall 107 of the housing 102, closing the aperture 103 as the tray 112 is opened. The lower curved panel 117, of the tray 112, further comprises a small overflow lip 118, allowing any excess water which may be used in flushing or cleaning to flow directly in through the aperture 103, the lip provides further direction during the disposing of animal waste in directing it in through the aperture 103. The overflow lip adjoins the tapered end of the animal waste receptacle 113. A stop mechanism (not shown) prohibits the tray 112 from moving too far beyond a substantially horizontal, open, waste receiving position, or a position whereby the solid curved subsection 117 rotates beyond the bottom of the aperture 103.

The animal waste disposal unit 100 is shown retrofit to a waste cleanout pipe access point 300 of a domestic waste disposal network. An upper opening indicated generally by reference numeral 123 is located above the top wall 104 of the animal waste disposal unit 100. This contains a removable cap 125 which allows access to the existing cleanout pipe without having to remove the animal waste disposal unit 100. However, at the distal end of the animal waste disposal unit 100, there is a lower opening indicated by the general reference number 124, this is connected to the cleanout pipe using standard plumbing connection methods which comply with the plumbing codes of the municipality of the location where the animal waste unit 100 is installed, thus, if necessary, the unit itself may be removed for access to the waste cleanout pipe 300.

The lateral width of the animal waste disposal unit 100 is greater than the diameter of the waste pipe 302, thus making it easier for a user to deposit any animal waste in the tray 112 of the animal waste disposal unit 100. In order to better direct the animal waste from the animal waste receptacle 113, a tapered channel is preferably provided so as to funnel the animal waste in through the aperture 103, directing the waste into the waste disposal network. The tapered channel tapers inwardly from the full width of the tray 112 towards its outlet having a width less than or equal to the diameter of a standard waste cleanout pipe 302. This channel further comprises an overflow lip 118 directing any overflowing animal waste or water potentially used for cleaning or flushing of any animal waste inward and away from the user (not shown).

Referring to FIGS. 2a, 2b, 2c, and 2d, wherein like parts previously described have been assigned the same reference numerals, there is provided an animal waste disposal unit divided into its' component parts.

Figures 2A, 2B, 2C:
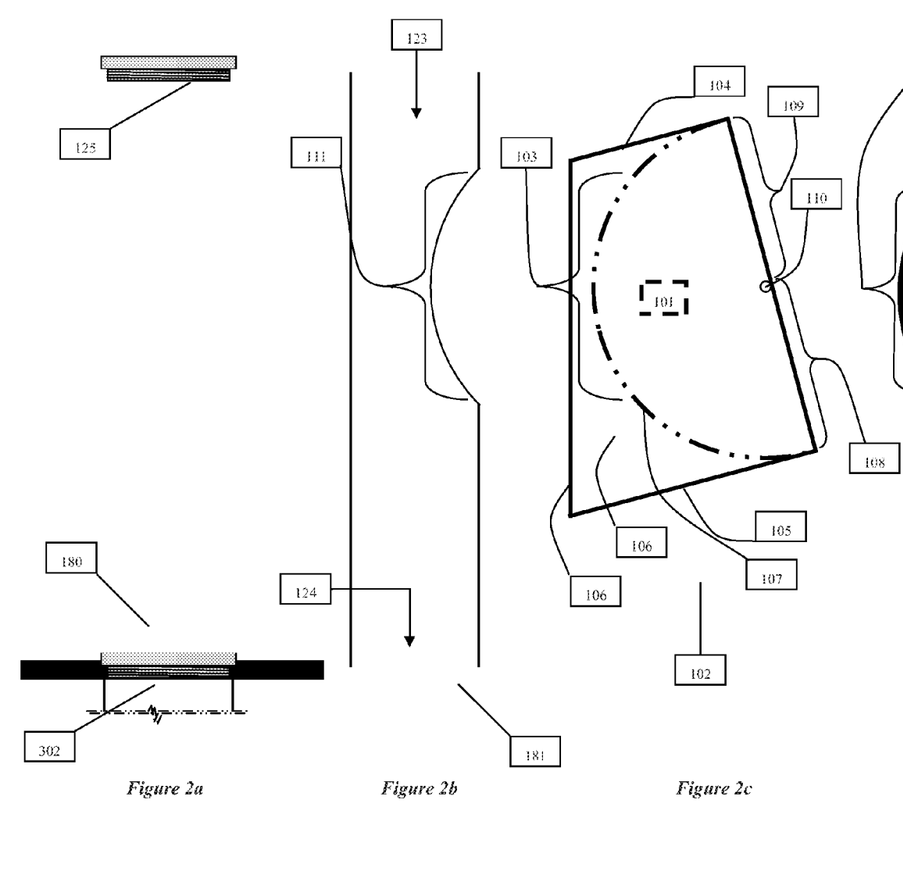
FIG. 2a is a side view of a standard existing cleanout waste pipe access point, and the side view of the removable cap of an animal waste disposal unit in accordance with the present invention.
FIG. 2b is a side view of the internal pipe, the upper capping or connection point, and the lower connection point of an animal waste disposal unit in accordance with the present invention.
FIG. 2c is a side view of the main housing of an animal waste disposal unit in accordance with the present invention with the internal curved wall of the main housing shown as a dashed line.

Referring to FIG. 2a, a waste cleanout access pipe is shown as indicated generally by the reference numeral 180. It is shown with its' cover removed thus providing a connection point for the base 124 of the animal waste disposal unit 100. A removable cap 125 for the animal waste disposal unit 100 is also shown. This provides normal access to the existing cleanout pipe 302 through the top 123 of the animal waste disposal unit 100. Access to the cleanout pipe 302 may be obtained by either removing the cap 125 on the top 123 of the animal waste disposal unit 100, or by removing the animal waste disposal unit 100 itself from its' lower connecting point 124.

Referring to FIG. 2b, the internal pipe containing an aperture 111 through which the animal waste enters from the internal compartment 101 of the animal waste disposal unit 100 is shown, as indicated generally by the reference numeral 181. The aperture 111 is similar in dimension and abuts to the aperture 103 contained within the housing 102 of the animal waste disposal unit 100. These combine to provide a water-tight seal between the housing 102 and the internal pipe 181 of the animal waste disposal unit 100. As the moveable tray 112 is opened, the combined apertures 103 and 111 are sealed by the lower curved panel 117 of the tray 112. This ensures the general functioning of the waste disposal network is uninhibited whether the animal waste disposal unit 100 is in use or not.

Referring to FIG. 2c, the main housing of the animal waste disposal unit 100 is shown as indicated generally by the reference number 102. The housing having a top wall 104, a bottom wall 105, side walls 106, an interior curved shaped wall 107, and a partial front wall 108. The top wall 104, bottom wall 105, side walls 106, interior curved shaped wall 107, and partial front wall 108, form an interior compartment 101 within the housing 102. An opening 109 is provided above the free end of the diagonally inward sloping front wall 108 of the housing 102. A further interior curved shaped wall 107 provides a barrier for which the tray 112 may rotate against to direct the waste in through the aperture 103, thus ensuring any waste is disposed of directly into a waste disposal conduit 302. The animal waste conduit 302 is connected to a waste disposal network (not shown). The interior curved shaped wall 107 contains an aperture 103 similar in dimension to that aperture 111 cut from the internal pipe 181. These abut and combine to provide a watertight seal between the housing unit 102 and the internal pipe unit 181. The housing 102 further comprises a mounting point 110 located at the free end of the diagonally inward sloping front wall 108.

Figure 2D:
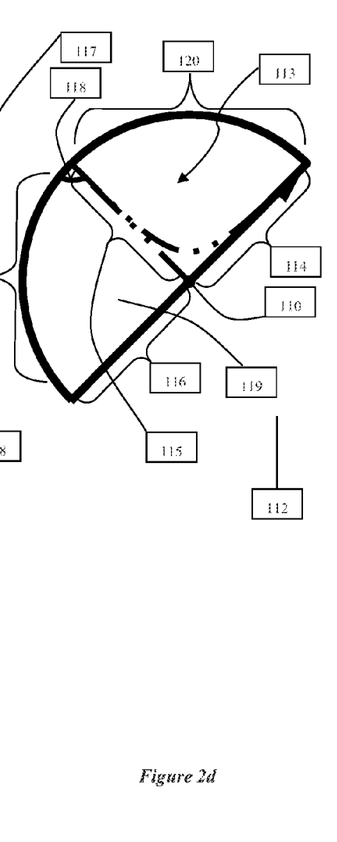
FIG. 2d is a side view of the moveable tray of an animal waste disposal unit in accordance with the present invention, shown in its' open waste receiving position, with the side wall of the moveable tray removed.

Referring to FIG. 2d, the moveable tray is shown as indicated generally by the reference numeral 112. The moveable tray consists of solid semi-curved side panels 119, a front panel consisting panels 114 and 116, a lower curved panel consisting 117, and curved tapered panels consisting 120, wherein the animal waste receptacle 113 moulds. Further to this the tray 112 consists an overflow lip 118 contained within the lower curved panel 117 adjoining the distal end of the animal waste receptacle 113. The tray opens and closes about a mounting point 110, and rotates in such a way that the curved panel 117, and curved tapered panels 120 of the tray 112, rotate against the interior curved shaped wall 103 of the housing 102. This serves two functions: a) it ensures that any waste is directed in through the aperture 111 of the internal pipe 181, and b) it ensures that as the tray is moved opened, the lower curved surface 117 of the tray 112 closes off the aperture 111 of the internal pipe 181.

The upper waste receiving section of the tray 112 comprises a first panel 114 and a second panel 115 which are angled relative to one another to form a V-shaped, animal waste receptacle 113 when the tray 112 is moved into its open position. In order to better direct the animal waste from the animal waste receptacle 113, a tapered channel is provided so as to funnel the animal waste in the animal waste receptacle 113 through the combined (watertight) apertures 103 and 111 and into the internal pipe 181, then subsequently into a waste disposal network 302. The tapered channel tapers inwardly from the full width of the tray 112 towards its outlet having a width less than or equal to the diameter of a waste pipe. This channel further comprises an overflow lip 118 directing any overflowing animal waste or water (potentially used for cleaning or flushing of any animal waste) inward and away from the user (not shown). This overflow-lip 118 is contained within the lower curved panel 117 of the moveable tray 112.

The lower subsection of the tray 112 comprises a second panel 115, a third panel 116, side panels 119, and a curved panel 117, which rotate against the interior curved shaped wall 107 of the housing 102, closing the aperture 103 as the tray 112 is opened. The combination of the lower subsections' curved surface 117, the upper sections' curved tapered surfaces 120, the interior curved shaped wall 103 of the housing 102, the tapered channel of the animal waste receiving receptacle 113, and the overflow lip 118, combine to ensure that any animal waste, or indeed cleaning or flushing solution, is funneled directly through the aperture 103 of the housing unit 102, through the aperture 111 of the internal pipe 181.

Figure 3A:
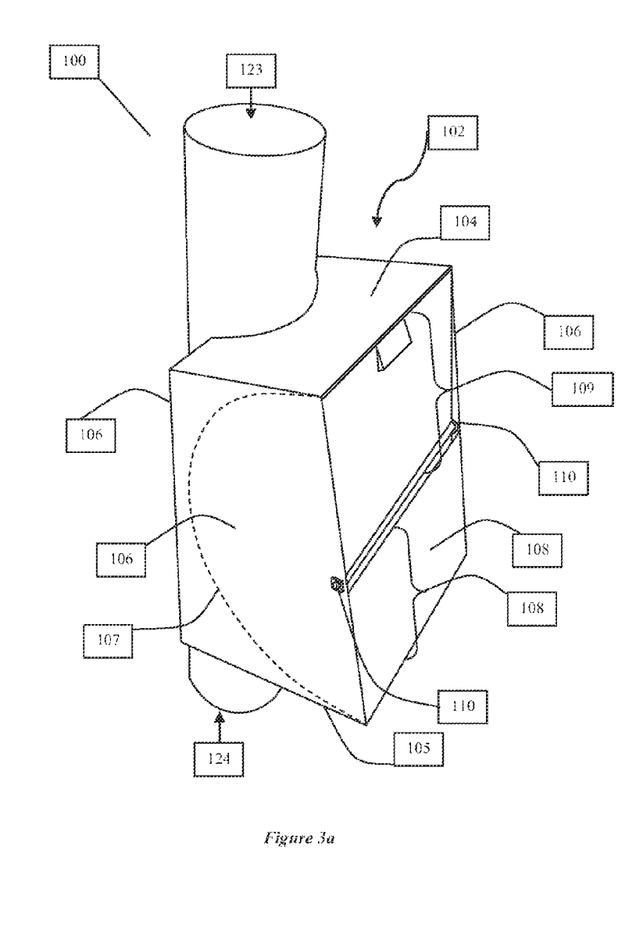
FIG. 3a is a sketch of an animal waste disposal unit in accordance with the present invention shown in its' closed position.
Figure 3B:
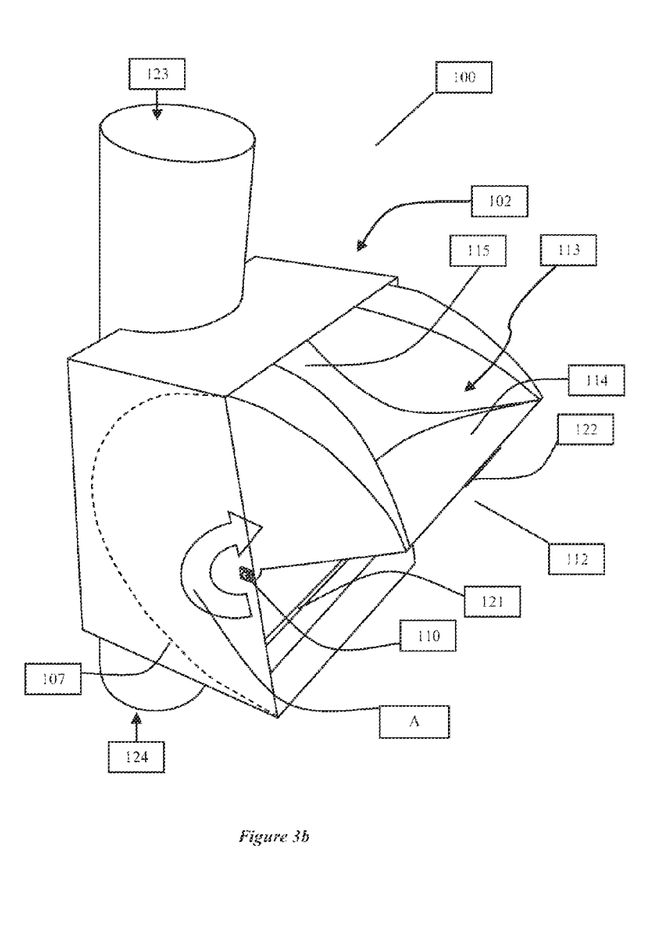
FIG. 3b is a sketch of an animal waste disposal unit in accordance with the present invention shown in its' open waste receiving position. The housing unit is shown with the upper portion of the front wall removed.

Referring to FIGS. 3a, and 3b, wherein like parts previously described have been assigned the same reference numerals, there is provided a sketch of an animal waste disposal unit in its' closed position (FIG. 3a) and in its' opened position (FIG. 3b) with the diagonally inward sloping front wall panel 118 removed (FIG. 3b).

Referring to the drawings related to FIGS. 3a and 3b, there is provided an animal waste disposal unit indicated generally by the reference numeral 100. The animal waste disposal unit 100 comprises a housing indicated generally by reference numeral 102 having a top wall 104, a bottom wall 105, side walls 106, an interior curved shaped wall 107, and a partial front wall 108. An opening 109 is provided above the free end of the diagonally inward sloping front wall 108 of the housing 102. The animal waste disposal unit 100 further comprises a tray indicated generally by the reference number 112 which is moveably mounted 110 to a free end of a diagonally inward sloping front wall 108. A further interior curved shaped wall 107 provides a barrier for which the tray 112 may rotate against to direct the waste into an aperture (not visible), thus ensuring any waste is disposed of directly into a waste disposal conduit (not shown). The waste conduit is connected to a waste disposal network (not shown).

The tray 112 may be moved about a mount point 110 at the free end of the diagonally inward sloping front wall 108, as indicated by reference arrow A, from an upright, closed position to an open, waste receiving position. The upper section of the tray 112 comprises a first panel 114 and a second panel 115 which are angled relative to one another to form a V-shaped, animal waste receptacle 113 when the tray 112 is moved into its open position. A handle 122 is provided on the first panel 114 to assist a user (not shown) to move the tray 112 between its closed position into its open position, and visa versa.

An upper opening indicated generally by reference numeral 123 is located above the top wall 104 of the animal waste disposal unit 100. This contains a cap (not shown) which allows access to the waste cleanout pipe (not shown) without having to remove the animal waste disposal unit 100. However, at the distal end of the animal waste disposal unit 100, there is a lower opening indicated by the general reference number 124, this is connected to the waste cleanout pipe (not shown) using standard plumbing connection methods which comply with the plumbing codes of the municipality of the location where the animal waste unit 100 is installed, thus, if necessary, the unit itself may be removed for access to the waste cleanout pipe (not shown).

At the base of the interior curved shaped wall 107 of the housing 102 where the interior curved shaped wall meets the bottom wall 106 of the housing 102, there is an excess water runoff or draining point 121.

Figure 4A:
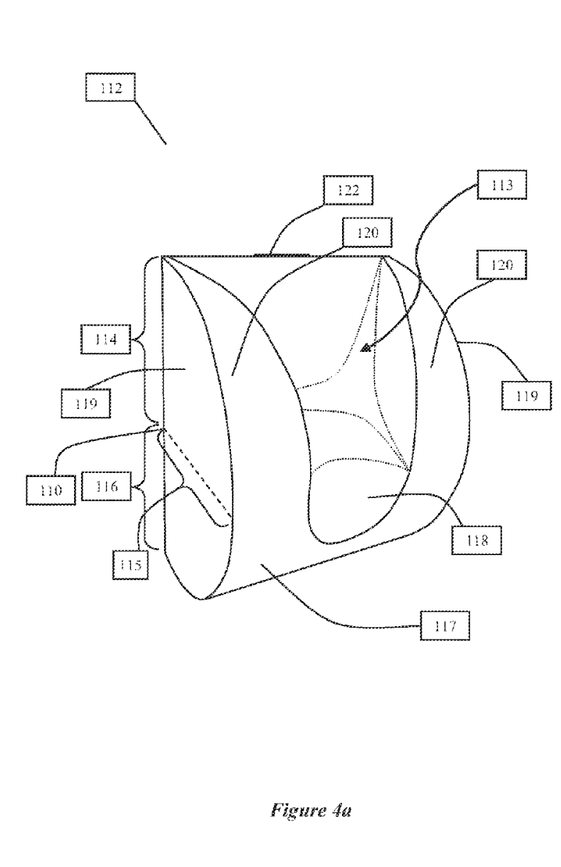
FIG. 4a is a sketch of the moveable tray of an animal waste disposal unit in accordance with the present invention shown in its' upright, closed position.
Figure 4B:
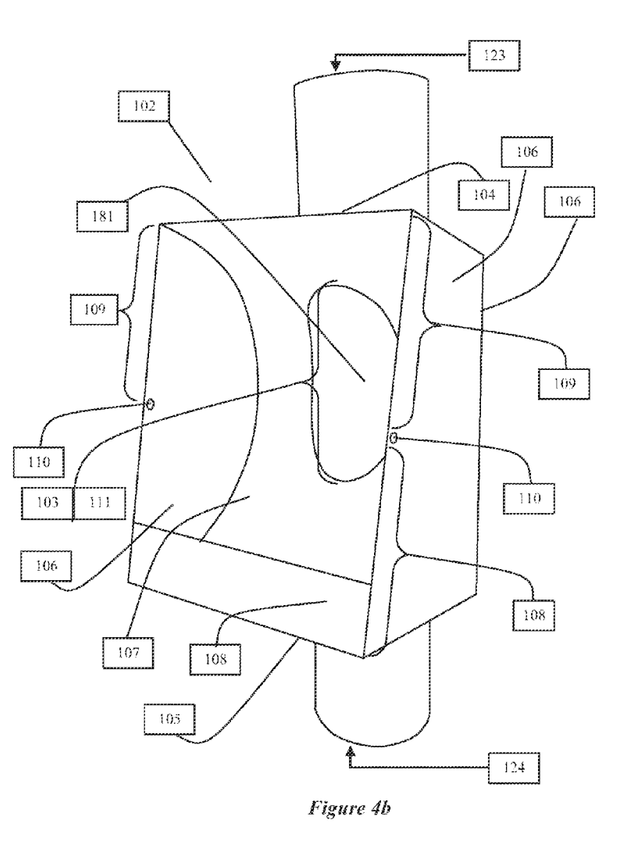
FIG. 4b is a sketch of the housing unit, internal pipe, upper capping or connection point, and lower connection point, of an animal waste disposal unit in accordance with the present invention. The housing unit is shown with the upper portion of the front wall removed.

Referring to FIGS. 4a, and 4b, wherein like parts previously described have been assigned the same reference numerals, there is provided a sketch of the individual component parts of an animal waste disposal unit; FIG. 4a representing a sketch of the moveable tray component in its' upright closed position indicated by the general reference numeral 112, and FIG. 4b representing a sketch of the main housing component indicated by the general reference numeral 102, incorporating the interior curved shaped wall 107, the watertight combined aperture (103 and 111) through which the animal waste passes into the waste disposal network, and the internal pipe 181 which directs the waste directly into the waste disposal network. FIG. 4b is shown with the upper section of the diagonally inward sloping front wall panel 108 partially removed.

Referring to FIG. 4a, the moveable tray is shown as indicated generally by the reference numeral 112. The moveable tray consists of semi-curved side panels 119, a front panel consisting panels 114 and 116, a lower curved panel consisting 117, and curved tapered panels consisting 120, wherein the animal waste receptacle 113 moulds. Further to this the tray 112 consists an overflow lip 118 contained within the lower curved panel 117 adjoining the distal end of the animal waste receptacle 113. The tray opens and closed about a mounting point 110, and rotates in such a way that the curved panel 117, and tapered curved panels 120 of the tray 112, rotate against the interior curved shaped wall 107 of the housing 102. This serves two functions: a) it ensures that any waste is directed in through the aperture 111 of the internal pipe 181, and b) it ensures that as the tray is opened, the lower curved surface of the tray 117 closes off the aperture 111 of the internal pipe 181.

The upper waste receiving section of the tray 112 comprises a first panel 114 and a second panel 115 which are angled relative to one another to form a V-shaped, animal waste receptacle 113 when the tray 112 is moved into its open position. In order to better direct the animal waste from the animal waste receptacle 113 into the waste pipe, a tapered channel is provided so as to funnel the animal waste in the animal waste receptacle 113 through the aperture 111 and into the internal pipe 181, then subsequently into an existing waste disposal network (not shown) via the lower opening 124 of the animal waste disposal unit. The tapered channel tapers inwardly from the full width of the tray 112 towards its outlet having a width less than or equal to the diameter of a waste pipe. This channel further comprises an overflow lip 118 directing any overflowing animal waste or water (potentially used for cleaning or flushing of any animal waste) inward and away from the user (not shown). This overflow-lip 118 is contained within the lower curved panel 117 of the moveable tray 112.

The lower subsection of the tray 112 comprises a second panel 115, a third panel 116, side panels 119, and a curved panel 117, which combine to form a curved surface which abuts against the interior curved shaped wall 107 of the housing 102 as the tray 112 is being opened or closed. The combination of the lower subsections' curved surface 117, the upper sections' curved tapered surfaces 120, the interior curved shaped wall 107 of the housing 102, the tapered channel of the animal waste receiving receptacle 113, and the overflow lip 118, combine to ensure that any animal waste, or indeed cleaning or flushing solution, is funneled directly through the aperture 103 of the housing unit 102, through the aperture 111 of the internal pipe 181.

Referring to FIG. 4b, there is provided the housing of an animal waste disposal unit with the moveable tray 112 removed along with the upper part of the front wall 108 of the housing partially removed indicated generally by the reference numeral 102. The housing having a top wall 104, bottom wall 105, side walls 106, interior curved shaped wall 107, and a partial front wall 108, which form an interior compartment within the housing 102. An opening 109 is provided above an inwardly sloping front wall 108. The interior curved shaped wall 107 provides a barrier for which the tray 112 may rotate against to direct the waste in through the aperture 103, thus ensuring any waste is disposed of directly into a waste disposal conduit. The animal waste conduit is connected to a waste disposal network (not shown). The interior curved shaped wall 107 contains an aperture 103 similar in dimension to that aperture 111 cut from the internal pipe 181. These abut and combine to provide a watertight seal between the housing unit 102 and the internal pipe unit 181. The housing 102 further comprises a mounting point 110 located at the free end of a diagonally inward sloping front wall 108.

Figure 5A:
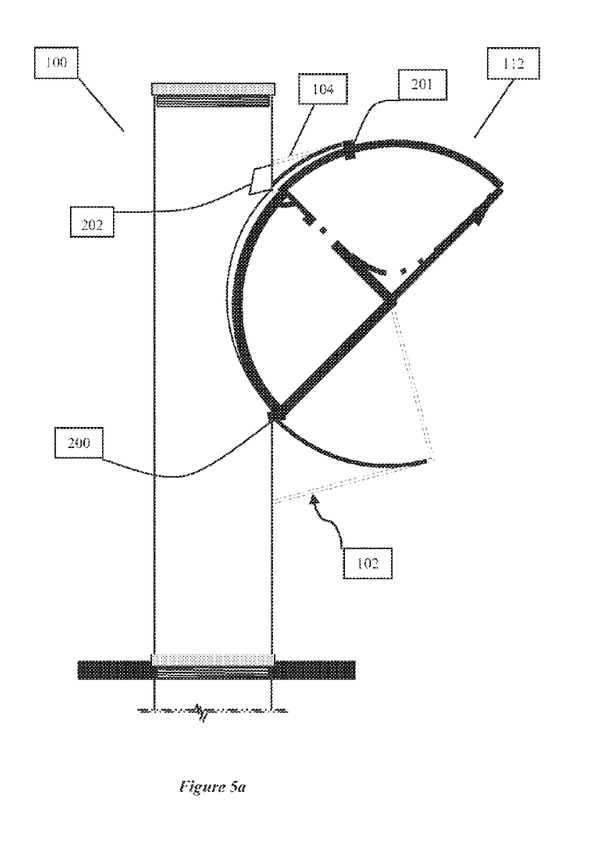
FIG. 5a is a side view of an animal waste disposal unit in accordance with the present invention, shown in its open waste receiving position, with the side wall of the main housing removed, and with the side wall of the moveable tray removed, further showing the embodiment of a latch, further showing the embodiment of a locking mechanism, and further showing the embodiment of an automatic flushing mechanism.

In a further embodiment, as referring to FIG. 5a, a latching mechanism 200 may be provided on the animal waste disposal unit 100 so as to retain the tray 112 in the open position allowing for 'hands free' use of said animal waste disposal unit 100.

In a further embodiment, the tray 112 may be dimensioned and/or weighted so as to be biased to return to its closed position when free of any standard influences or forces.

In a further embodiment, a child lock (not shown) may be integrated into the animal waste disposal unit 100 to prevent undesirable access and moving of the tray 112 by children.

In a further embodiment, referring to FIG. 5a, a locking mechanism 201 may be integrated into the animal waste disposal unit 100 to prevent unauthorised access and moving of the tray 112.

In a further embodiment, the animal waste disposal unit 100 may be incorporated into a bin type structure in order to improve the stability and aesthetics of the unit. It should be noted that the top wall of the bin structure may be preferably provided with a lipped edge in order to facilitate the retention of a flower pot so as to increase the aesthetic beauty of the animal waste disposal unit 100.

In a further embodiment, the top wall may be provided with a small refuse bin and/or a cigarette ash tray.

In further embodiments, it is envisaged that the animal waste disposal unit 100 may be incorporated into, but not limited to three waste disposal network settings:

a) domestic 'bin' embodiment; in this embodiment the animal waste disposal unit is incorporated into the domestic waste disposal network as described in the embodiments outlined above.

b) domestic 'in-line' embodiment; in this embodiment the animal waste disposal unit is incorporated into the domestic waste disposal network retrofit and in-line with a waste downpipe by simply using the upper opening 123 and lower opening 124 as connection points to fit the unit into an existing waste downpipe. The animal waste disposal unit 100 would be connected to the existing waste downpipe using standard plumbing connection methods which comply with the plumbing codes of the municipality of the location where the animal waste unit 100 is installed.

Figure 6:
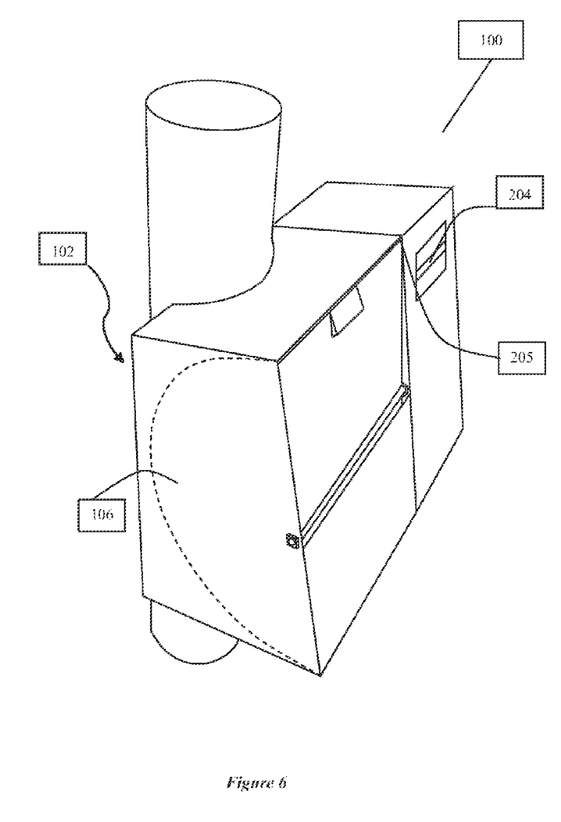
FIG. 6 is a sketch of an animal waste disposal unit in accordance with the present invention shown in its closed position, showing the embodiment of the animal waste disposal unit incorporated with a controlled access unit.

It will be further understood that one or more anti-splash deflector plates (not shown) may be preferably provided within the interior compartment 101 of the animal waste disposal unit 100 to prevent splash back of any fluids passing through the waste down-pipe which is connected to the upper opening 123 and the lower opening 124 of the animal waste disposal unit 100 as the tray 112 is moved from its open position towards its closed position.

c) public or commercial 'bin' embodiment; in this embodiment, referring to FIG. 6, the animal waste disposal unit 100 incorporates a controlled access unit 204, including but not limited to; a payment unit (not shown), and/or a code scanning (eg: barcode) unit (not shown), and/or an alphanumerical keypad (not shown), integrated as part of the animal waste disposal unit 100 in order to facilitate controlled access to the animal waste receptacle 113. In use, a member of the public (not shown) will be asked to pay a nominal sum of money, and/or scan a unique coded disposable biodegradable animal waste collection bag, and/or enter manually a code present on a coded disposable biodegradable animal waste collection bag into the alphanumerical keypad, in order to allow the tray 112 to move from its closed position to its open position to present the animal waste receptacle 113 to a member of the public. A latching mechanism 205, such as an electromagnetic lock, may be used to control access to the animal waste receptacle 113. In is envisaged that this embodiment would be used in public access areas, for example, private or local authority run parks or other public settings.

Figure 5B:
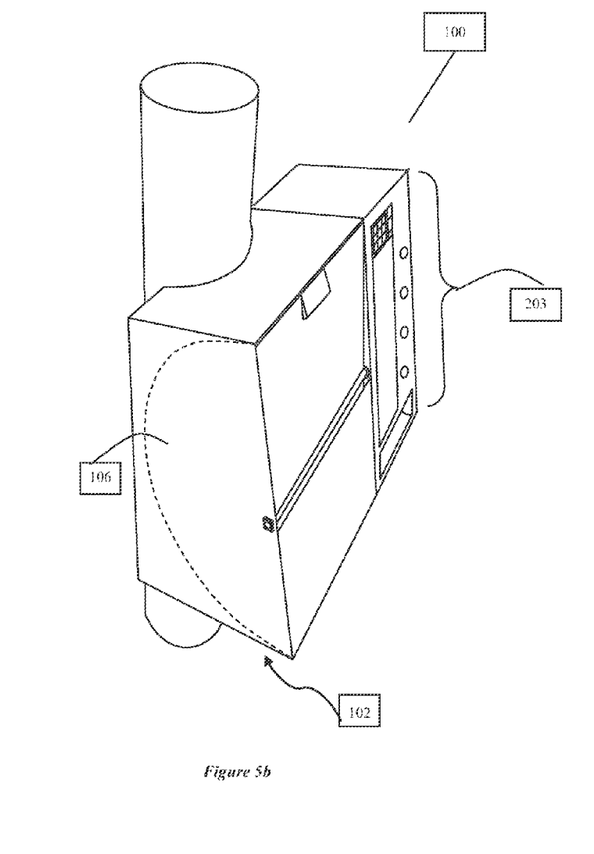
FIG. 5b is a sketch of an animal waste disposal unit in accordance with the present invention shown in its closed position showing the embodiment comprising a vending unit to facilitate the distribution of animal related products.

In a further embodiment, referring to FIG. 5b, it is envisaged that a vending machine unit 203 may be incorporated or adjoined to the animal waste disposal unit to allow ancillary products such as coded disposable bio-degradable bags for animal waste, and/or barcoded disposable bio-degradable bags for animal waste, to be dispensed from the vending machine. Furthermore, cloths, hand wipes and other such products could also be sold from the vending machine.

In a further embodiment, referring to FIG. 5a, it is envisaged that an automatic flushing mechanism 202 may also form part of the animal waste disposal unit by connecting the animal waste disposal unit 100 to an existing water supply. The flushing mechanism 202 is attached to the interior of the animal waste disposal unit 200, underneath the top wall 104. The flushing mechanism may be initiated upon the member of public moving the tray 112 from its open position back into its closed position. This flushing mechanism may serve to clear the animal waste from the units' enclosure and advance it into the mainflow of the municipal sanitary sewer system. The flushing mechanism may also serve to clean the interior compartment of the animal waste disposal unit.

In a further embodiment it is envisaged that the tray 112 is biased to move into the closed position from the open waste receiving position if left opened or unused for a predetermined period of time or predetermined period of non-use. This will ensure that if a member of the public leaves the unit opened by accident, it will automatically close, flush and clean itself, ready for a subsequent user.

Throughout the preceding specification, the term "animal waste" shall be understood to refer to waste produced by animals and in particular pets. This shall include but not be limited to dog excrement, cat excrement, fecal matter and/or waste matter.

The terms "comprise" and "include", and any variations thereof required for grammatical reasons, are to be considered as interchangeable and accorded the widest possible interpretation.

The invention is not limited to the embodiments herein before described which may be varied in both construction and detail.

I claim:

1. An apparatus for animal waste disposal comprising:
a housing comprising a top wall, a bottom wall, side walls and an interior curved shaped wall including a housing aperture configured for integral connection to a conduit aperture in a conduit of an external sanitary sewer, the housing defining an interior compartment and having an opening providing external access to the interior compartment; and
a tray comprising a first panel and a second panel angled relative to one another, a pair of side panels, and a pair of curved surfaces, said panels and said curved surfaces defining a waste receptacle that forms a tapered channel to funnel said animal waste into said external sanitary sewer, the tapered channel tapering inwardly from a full width of the tray toward the housing aperture, the tray being rotatably mounted in the opening and having a curved shape substantially conforming to a shape of the interior curved shaped wall, and the tray being rotatable within the housing relative to the opening between a first position in which animal waste can be deposited into the waste receptacle, and a second position in which deposited animal waste is directed along the tapered channel and passes through the housing aperture and the conduit aperture to direct said animal waste into the external sanitary sewer.

2. The apparatus according to claim 1 wherein said tray forms a seal at the opening of said housing when in either the first position or the second position.

3. The apparatus according to claim 1 wherein the tray comprises a latch to retain the waste receptacle in the first position.

4. The apparatus according to claim 1 wherein the tray is biased to move into the second position from the first position.

5. The apparatus according to claim 1 wherein the tray, irrelevant of position, will provide an effective shield for the user from being splashed by any waste content passing through said sanitary sewer.

6. The apparatus according to claim 1 further comprising a lower conduit for fluidly connecting the apparatus to a manhole or sewer access point of the external sanitary sewer.

7. The apparatus according to claim 1 further comprising an upper conduit for installing the apparatus in-line with a waste disposal pipe.

8. The apparatus according to claim 1 further comprising a limited access control unit to facilitate unlocking and operation of the tray.

9. The apparatus according to claim 8 wherein said limited access control unit is controllable to allow access to the waste receptacle once direct or indirect payment has been made via said limited access control unit.

10. The apparatus according to claim 8 further comprising a lock to prevent non-direct or non-indirect payment based operation of the tray.

11. The apparatus of claim 1 wherein the tray is biased to move into the second position from the first position if left in the first position for a predetermined period of time.

12. The apparatus according to claim 1 further comprising an automatic flushing mechanism which is initiated on movement of the tray into the second position.

13. The apparatus according to claim 1 further comprising a vending unit to facilitate distribution of animal related products.

14. The apparatus of claim 1, wherein the conduit comprises a waste cleanout pipe of a domestic waste disposal network.

* * * * *